Patented Apr. 25, 1939

2,155,593

UNITED STATES PATENT OFFICE 2,155,593

PREVENTING ADHERENCE OF CONGEALED SUBSTANCES TO METALS

Charles Hardy, Pelham Manor, N. Y., assignor to Hardy Metallurgical Corporation, New York, N. Y., a corporation of Delaware No Drawing. Application November 5, 1937
Serial No. 172,913

2 Claims. (Cl. 75—22)

This invention is concerned with the manufacture of metal structures to which liquids do not tend to adhere upon congealing. More specifically, the invention aims to provide improved structures having a porous aluminum member impregnated with a substance which forms no bond or at most a weak bond with the congealing liquid, and also aims to provide improved methods of forming such structures.

In my co-pending application, Serial No. 148,660, filed June 17, 1937, I have described a product to which liquid does not tend to adhere upon congealing in contact therewith which comprises a finely porous metal base made by compressing and heating metal powders and impregnated with a substance which is insoluble in and repellent of the congealing liquid and which is solid at ordinary temperatures but liquid at moderately elevated temperatures—for example, a waxy substance having a low shearing strength. Congealed liquids, for example ice, may be freed from such an impregnated base by mere pressure, without the heretofore customary practice of warming the structure to melt the bond between metal and congealed liquid. After continued use, the film of impregnant on the outside of the base may become exhausted. However, the film can be renewed an almost indefinite number of times simply by heating the base until some of the impregnant (for example, carnauba wax) exudes. So the housewife may recondition ice trays at intervals of a few months by setting them for a moment on the kitchen stove. The impregnated porous metal base thus affords important advantages over solid metal trays, even though the latter may be coated originally with a substance that tends to prevent adhesion of the ice.

The porous metal base made as described in my co-pending application is reasonably strong, but for certain purposes where high strength is requisite it is desirable to reenforce the porous base by fastening it securely to a reenforcing piece, preferably of solid metal. In the case of porous metal structures made of "aluminum" (which term I employ to designate alloys in which aluminum is the major constituent as well as the pure metal itself) it is difficult to fasten the porous structure to the reenforcing metal with a weld, and ordinary methods of welding do not afford a satisfactory bond. However, I have found that the porous aluminum base may be fastened to the reenforcing member by diffusion welding if the surface of the reenforcing member is clean and rough and the welding is conducted with the porous base held to the roughened surface for a relatively long time under considerable pressure at a temperature below the melting point of the aluminum but at which the aluminum of the porous metal base tends to diffuse into the metal of the reenforcing member.

The reenforcing piece may be of almost any strong metal. Steel strips may be used, but aluminum is preferred. The requisite clean rough surface of the piece may be secured by etching, sand-blasting or by so-called "anodic" treatment in which migration of metal from the piece leaves a pitted surface.

The pressure employed and the duration of the welding operation are somewhat dependent upon the temperature. In general, higher temperatures permit the formation of strong bonds with lower pressures or shorter periods of time. In no case, however, should diffusion welding between the porous portion and the reenforcing member be attempted under pressures less than 100 pounds per square inch, unless the reenforcing member has been embedded in the mass of metal powder and while thus embedded subjected to the compression employed to consolidate the powder. Pressures as high as 50 tons per square inch have been employed successfully under certain conditions, as will presently appear.

The temperature must be such that aluminum will diffuse, and low temperatures may be employed if the welding treatment is prolonged over an abnormally long period.

Practically, in order to insure the formation of an adequate bond in a matter of hours, as compared with days, the operation should be conducted at a temperature below the melting point of the aluminum but within about 60° C. of the melting point. Thus adequate bonds have been secured by clamping a pre-formed porous portion to the reenforcing piece under a force of about 100 pounds per square inch and holding the junction between the clamped piece and portion at a temperature of 620° C. for a period of 10 hours.

The procedure employed may vary, and I describe below two modifications which I prefer to employ:

The porous portion may be prepared separately according to the method described in my aforementioned co-pending application, and before impregnation be welded to the reenforcing piece. Thus a mixture of aluminum powder and camphor or salicylic acid is pressed in a mold into a coherent mass under a force of from 30 to 50 tons per square inch, and the mass is heated to and maintained at a temperature below the melting point of aluminum but at which the aluminum diffuses between the metal powder particles to form bonds. The camphor escapes during the heating operation and the mass is left with a great number of fine open pores. Thereafter the porous mass is cut into convenient strips and clamped to an aluminum sheet which has been etched for a few seconds in an aqueous solution containing about 25% HCl and then dried under non-oxidizing conditions, say in the presence of absolute alcohol. A clamping force of at least 100 pounds per square inch is exerted, and while clamped the porous piece and the reenforcing piece are subjected to a temperature of 620° C. for a period of about 10 hours. Thereafter the whole is cooled and it is found that a strong diffusion weld has resulted.

Good results also are obtained with less manipulation if the reenforcing piece is embedded in the aluminum powder-camphor mixture in the mold, compressed therein and subjected to heating in the same manner as when the porous mass is formed separately. Thus the coherent porous mass is formed around the reenforcing piece, and the bond between reenforcing piece and porous mass is formed at the same time that the aluminum powder particles become welded together. If this procedure is employed the welding may be accomplished without imposing substantial pressure during the welding operation. It is particularly desirable in forming strips to be used in making ice tray grids, where the entire surface of the grids should be such as to prevent the formation of a strong bond with the ice.

I claim:

1. In a method of making a structure to which a liquid does not tend to adhere strongly upon congealing in contact therewith, the improvement which comprises compressing a mixture of aluminum powder particles with a volatile binder to form a coherent mass, and heating said mass in juxtaposition with a rough-surfaced substantially non-porous metallic reenforcing member, while compressing the two together under a force of at least 100 pounds per square inch, the heating being conducted at a temperature such that the volatile binder is expelled and the particles become bonded to each other and the mass becomes bonded to the reenforcing member by diffusion welding, whereby a reenforced porous structure is formed in which substantially all of the pores communicate with a surface of the structure in contact with which said liquid may congeal, and impregnating said porous structure by introducing thereinto a substance that is solid at ordinary temperatures and at the temperature of congelation but molten at moderately elevated temperatures in which condition it tends to exude from the pore structure during repeated heating.

2. A metallic object substantially non-adherent to a substance congealed in contact therewith which comprises a porous mass of aluminum powder particles diffusion welded to each other and to a rough-surfaced non-porous metallic reenforcing member, the interstices between the particles forming a pore structure which communicates with a surface in contact with which said substance is congealed, said pore structure being filled with and said surface being coated with a material that is solid at ordinary temperatures and at the temperature of congelation but liquid at relatively elevated temperatures and which, when liquid, tends to exude from the pore structure, the proportions of said material in the object being such that the coating on said surface may be renewed repeatedly by heating and resultant exudation.

CHARLES HARDY.